United States Patent
Wu

(10) Patent No.: US 8,274,255 B2
(45) Date of Patent: Sep. 25, 2012

(54) MULTI-FUNCTION REMOTE CONTROL AND A METHOD FOR OBTAINING RESIDUAL POWER

(75) Inventor: Shu Hong Wu, Fuqing (CN)

(73) Assignee: TPV Electronics (Fujian) Co., Ltd., Fuqing, Fujian Province (CN)

( * ) Notice: Subject to any disclaimer, the term of this patent is extended or adjusted under 35 U.S.C. 154(b) by 373 days.

(21) Appl. No.: 12/754,654

(22) Filed: Apr. 6, 2010

(65) Prior Publication Data
US 2011/0241921 A1 Oct. 6, 2011

(51) Int. Cl.
*H02J 7/00* (2006.01)
(52) U.S. Cl. ........ 320/109; 320/116; 320/134; 320/136; 340/636.15; 340/635; 340/636.1; 341/176; 341/178; 324/157; 324/426; 324/437
(58) Field of Classification Search ............. 340/636.15, 340/635, 636.1; 320/100, 101, 109, 116, 320/134, 136; 324/157, 426, 437, 734; 341/176, 341/178
See application file for complete search history.

(56) References Cited

U.S. PATENT DOCUMENTS

| | | | | |
|---|---|---|---|---|
| 5,596,261 A * | 1/1997 | Suyama | | 320/152 |
| 6,114,830 A * | 9/2000 | Luo | | 320/101 |
| 6,114,833 A * | 9/2000 | Langston et al. | | 320/109 |
| 6,414,465 B1 * | 7/2002 | Banks et al. | | 320/118 |
| 6,498,458 B1 * | 12/2002 | Chen | | 320/114 |
| 7,669,061 B2 * | 2/2010 | Curt et al. | | 713/300 |
| 7,777,445 B2 * | 8/2010 | Uchiyama et al. | | 320/101 |
| 7,907,060 B2 * | 3/2011 | Reams | | 340/636.15 |
| 2008/0150783 A1 * | 6/2008 | Huang | | 341/176 |
| 2009/0146605 A1 * | 6/2009 | Uchiyama et al. | | 320/101 |
| 2009/0284403 A1 * | 11/2009 | Chu et al. | | 341/176 |
| 2011/0266999 A1 * | 11/2011 | Yodfat et al. | | 320/107 |
| 2011/0273138 A1 * | 11/2011 | Baarman et al. | | 320/108 |

* cited by examiner

*Primary Examiner* — Linh Nguyen
(74) *Attorney, Agent, or Firm* — Alan Kamrath; Kamrath IP Lawfirm, PA

(57) ABSTRACT

The present invention is related to a multi-function remote control which is supplied power by a rechargeable battery. The multi-function remote control comprises a micro controller unit (MCU), a residual power display, a button unit, a current detector and a voltage detector. The MCU couples to the rechargeable battery and then charges or discharges the rechargeable battery. The current detector measures the current of the rechargeable battery and correspondingly outputs a current-value signal ($S_i$) to the MCU. The voltage detector measures the voltage of the rechargeable battery and correspondingly outputs a voltage-value signal ($S_v$) to the MCU. Then, the MCU obtains the residual power of the rechargeable battery by means of analyzing the current-value signal ($S_i$) and voltage-value signal ($S_v$), and then reveals the corresponding residual power by the residual power display. Whereby, the multi-function remote control might have functions of remote control, charging and revealing residual power.

16 Claims, 7 Drawing Sheets

MULTI-FUNCTION REMOTE CONTROL AND A METHOD FOR OBTAINING RESIDUAL POWER

FIELD OF THE INVENTION

The present invention relates to a remote control, particularly to a multi-function remote control which has function of remote control, battery charge and obtaining residual power, and the method of obtaining residual power.

DESCRIPTION OF THE PRIOR ART

In this modern time, remote control is a popular and convenient gadget which is often seen in our daily life. The remote control is normally used in TV, digital frame, video equipment, multimedia device, guidance machine, air conditioner, image projector, etc, and some of the reasons are that people don't like to move or lazy to move, and the other reasons might be the inconvenience for people to reach the controlled apparatus distant far away. The mechanism for the remote control to function is: a remote control transmitter may transmit encoded infrared signal, and then the encoded signal is decoded and afterward activates the controlled apparatus. So that people have no necessary to touch the apparatus directly. Thus, it may be absolutely convenient for us to control electrical apparatus far away by means of the infrared signal and the remote control.

Conventionally, the power source of the remote control might be battery; however, the power of the battery may exhaust and thus people need to replace the battery. The discarded battery can cause soil contamination or other pollution. Alternatively, rechargeable battery sound to be a good solution, but, it need additional purchased power charger. That's cost and troublesome.

Therefore, how to resolve the problem of replacing battery or purchasing the power charger is a critical issue need to be settled.

SUMMARY OF THE INVENTION

The primary object of present invention is to resolve the problem of replacing battery or purchasing the power charger.

To achieve the foregoing and other objects, a multi-function remote control which is supplied power by a rechargeable battery is provided. The multi-function remote control comprises a micro controller unit (MCU), a residual power display, a button unit, a remote control transmitter, a current detector, a voltage detector and at least one detachable connector. The MCU couples to the rechargeable battery and then charges or discharges the rechargeable battery. The button unit includes pluralities of functional buttons. When the functional button is pressed, the functional button could output a functional signal ($S_{func}$) to the MCU. The remote control transmitter transmits encoded infrared signal by means of the control of the MCU when the MCU receives the functional signal ($S_{func}$). The current detector measures the current of the rechargeable battery and correspondingly outputs a current-value signal ($S_i$) to the MCU. The voltage detector measures the voltage of the rechargeable battery and correspondingly outputs a voltage-value signal ($S_v$) to the MCU. Then, the MCU obtains the residual power of the rechargeable battery by means of analyzing the current-value signal ($S_i$) and voltage-value signal ($S_v$), and then reveals the corresponding residual power by the residual power display. When the detachable connector is connected to external power supply, the detachable connector couples to the MCU and then the MCU charges the rechargeable battery. Whereby, the multi-function remote control might have functions of remote control, charging and revealing residual power.

To achieve the foregoing and other objects, another multi-function remote control which is supplied power by a rechargeable battery is provided. The multi-function remote control comprises a MCU, a display unit, a button unit, a remote control transmitter, a current detector, a voltage detector and at least one detachable connector. The MCU couples to the rechargeable battery and then charges or discharges the rechargeable battery. The button unit includes pluralities of functional buttons. When the functional button is pressed, the functional button outputs a functional signal ($S_{func}$) to the MCU and then the display unit reveals at least one functional content (Cs1, Cs2, Cs3 . . . ) correspondingly. When the MCU receives the functional signal ($S_{func}$) the remote control transmitter transmits encoded infrared signal by means of the control of the MCU. The current detector measures the current of the rechargeable battery and correspondingly outputs a current-value signal ($S_i$) to the MCU. The voltage detector measures the voltage of the rechargeable battery and correspondingly outputs a voltage-value signal ($S_v$) to the MCU. Then, the MCU obtains the residual power of the rechargeable battery by means of analyzing the current-value signal ($S_i$) and voltage-value signal ($S_v$), and then reveals the corresponding residual power by showing the residual power value ($C_{CPT}$) on the display unit. The detachable connector couples to the MCU. When the detachable connector is connected to external power supply, the MCU charges the rechargeable battery. Whereby, the multi-function remote control might have functions of remote control, charging and revealing residual power.

To achieve the foregoing and other objects, yet another multi-function remote control which is supplied power by a rechargeable battery is provided. The multi-function remote control comprises a MCU, a touch panel screen, a button unit, a remote control transmitter, a current detector, a voltage detector and at least one detachable connector. The MCU couples to the rechargeable battery and then charges or discharges the rechargeable battery. The touch panel screen includes a display unit, a sensor unit, an analog-to-digital converter (AD converter) and a driver unit. The sensor unit senses the position and the movement of contact site. The AD converter transfers the analog signal of the position and movement into digital signal. The driver unit analyzes the digital signal of the position and movement and then outputs a functional signal ($S_{func}$) to the MCU. The display unit reveals at least one functional content (Cs1, Cs2, Cs3 . . . ) correspondingly. When the MCU receives the functional signal ($S_{func}$) the remote control transmitter transmits encoded infrared signal by means of the control of the MCU. The current detector measures the current of the rechargeable battery and correspondingly outputs a current-value signal ($S_i$) to the MCU. The voltage detector measures the voltage of the rechargeable battery and correspondingly outputs a voltage-value signal ($S_v$) to the MCU. Then, the MCU obtains the residual power of the rechargeable battery by means of analyzing the current-value signal ($S_i$) and voltage-value signal ($S_v$), and then reveals the corresponding residual power by showing the residual power value ($C_{CPT}$) on the display unit. The detachable connector couples to the MCU. The MCU charges the rechargeable battery when the detachable connector is connected to external power supply. Whereby, the multi-function remote control might have functions of remote control, charging and revealing residual power.

To achieve the foregoing and other objects, a method for obtaining residual power from all of the multi-function remote controls as described before, comprising the steps: coupling the current detector to the rechargeable battery in series; coupling the voltage detector to the rechargeable battery in parallel; setting the selection of the rechargeable battery by means of the functional signal ($S_{func}$); obtaining the resistance of the rechargeable battery by means of the voltage-value signal ($S_v$), current-value signal ($S_i$) and Ohm's law; comparing the category of the rechargeable battery and the resistance, and then obtaining the residual power value of the rechargeable battery.

Whereby, the multi-function remote controls according present invention may both control various electrical equipments and serve as flashlight or laser pointer. Besides, the multi-function remote controls can also charge all kinds of rechargeable batteries. Thus, no need to further purchase power charger and the problem of battery replacement is settled. Additionally, the method for obtaining residual power from all of the multi-function remote controls could reveal residual power of all categories of rechargeable batteries real-time. Thus, the functions of present invention may be diversified.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1A:
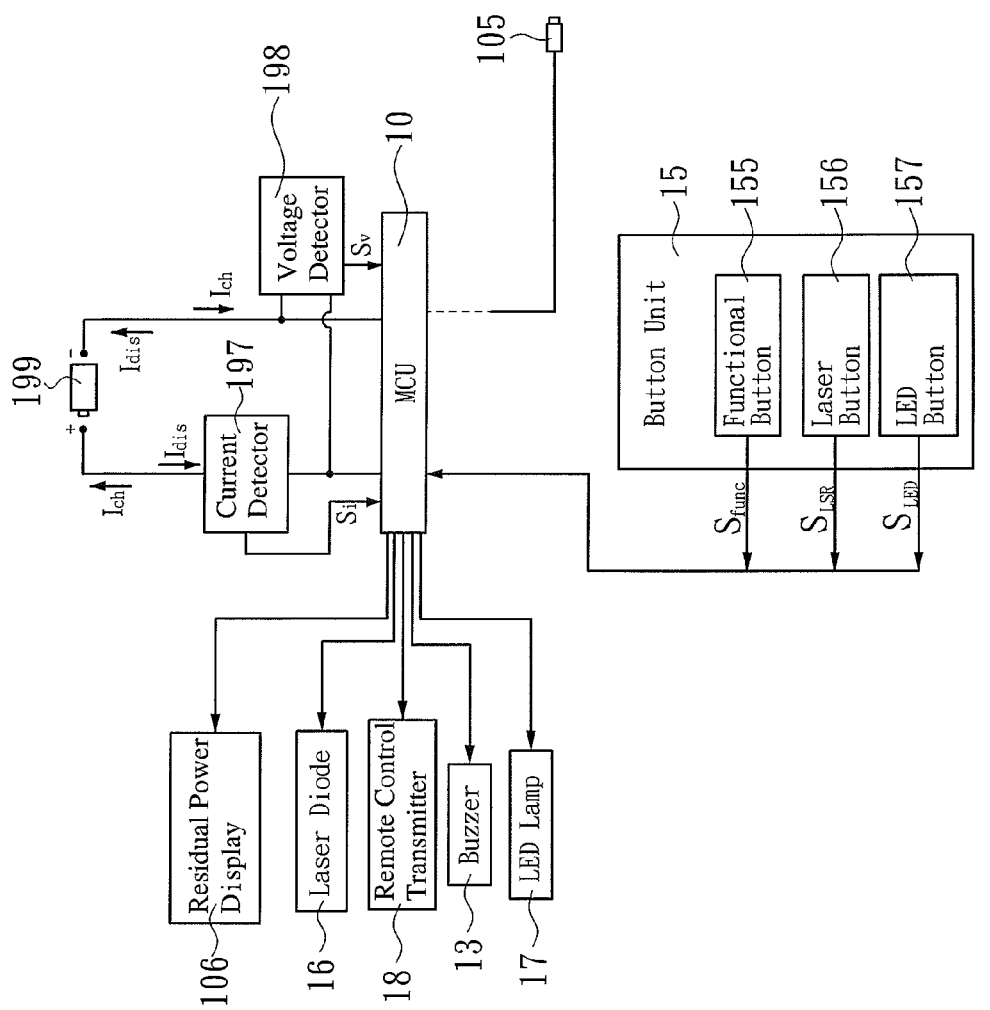
FIG. 1A is block diagram of the multi-function remote control according to the first embodiment of present invention.

Please refer to FIG. 1A, FIG. 1A is block diagram of the multi-function remote control according to the first embodiment of present invention. As shown in FIG. 1A, a multi-function remote control 1 could be used not only in TV, monitor, air conditioner, video player, audio equipment, digital frame, video equipment, multimedia device, guidance machine, image projector, but also in many other electrical equipments. The multi-function remote control 1 is supplied power by a rechargeable battery 199. The multi-function remote control 1 comprises a Micro Controller Unit 10 (MCU), a residual power display 106, a button unit 15, a remote control transmitter 18, a current detector 197, a voltage detector 198, a detachable connector 105, a laser diode 16, a Light-Emitting Diode lamp 17 (LED lamp) and a buzzer 13. The MCU 10 is coupled to the rechargeable battery 199, and thus could charge or discharge the rechargeable battery 199. The button unit 15 includes plurality of functional buttons 155 (only one is depicted), a laser button 156 and a LED button 157. When the functional button 155 is pressed, a functional signal ($S_{func}$) could be outputted to the MCU 10. When the laser button 156 is pressed, a laser signal ($S_{LSR}$) could be outputted to the MCU 10 and then the laser diode 16 might emit laser light by means of the control of the MCU 10. Therefore, the multi-function remote control 1 could be served as laser pointer when briefing. When the LED button 157 is pressed, a LED signal ($S_{LED}$) could be outputted to the MCU 10 and then the LED lamp 17 might emit visible light by means of the control of the MCU 10. Therefore, the multi-function remote control 1 could be served as a small flashlight or illuminating apparatus. Moreover, when the MCU 10 receives the functional signal ($S_{func}$), the remote control transmitter 18 could transmit encoded infrared signal by means of the control of the MCU 10. Thus, all kind of aforementioned electrical equipment is absolutely able to be controlled. The buzzer 13 could sound by means of the control of the MCU 10. The current detector 197 is coupled to the rechargeable battery 199 in series and could measure the current passing through the rechargeable battery 199 and then correspondingly output a current-value signal ($S_i$) to MCU 10 in real-time. The voltage detector 198 is coupled to the rechargeable battery 199 in parallel and could measure the voltage of the rechargeable battery 199 and then correspondingly output a voltage-value signal ($S_v$) to MCU 10 in real-time. The MCU 10 analyzes the current-value signal ($S_i$) and the voltage-value signal ($S_v$) and then obtains the residual power of the rechargeable battery 199; as a result, the corresponding residual power could be revealed by means of the residual power display 106. The detachable connector 105 is coupled to the MCU 10. When the detachable connector 105 is connected to external power supply, the MCU 10 could charge power to the rechargeable battery 199. In preferred embodiment, the detachable connector 105 could be Universal Serial Bus (USB) or Mini USB. Besides, the detachable connector 105 may selectively connect to the multi-function remote control 1 and hence couple to MCU 10, or separate from the multi-function remote control 1. For the reason of selectively connect or separate, a dash-line is placed between the MCU 10 and detachable connector 105 in FIG. 1A.

In this embodiment, the multi-function remote control 1 could connect to the USB socket of any computer by means of the detachable connector 105. In this manner, the computer could provide a 5V DC voltage and 500 mA DC current to the multi-function remote control 1, so as to make MCU 10 output a charge current ($I_{ch}$) to the rechargeable battery 199. When charging, the direction of the charge current ($I_{ch}$) enters the positive electrode of the rechargeable battery 199 and then leaves from the negative electrode. If the detachable connector 105 is removed from the multi-function remote control 1, the multi-function remote control 1 can not have external power supply and hence can not charge power to the rechargeable battery 199. In this manner, the rechargeable battery 199 discharges and provides power to the multi-function remote control 1. When the rechargeable battery 199 discharges, the direction of the discharge current ($I_{dis}$) leaves the positive electrode of the rechargeable battery 199 and then passes through the MCU 10 or other components of the multi-function remote control 1, and then enters the rechargeable battery 199 from its negative electrode.

Figure 1B:
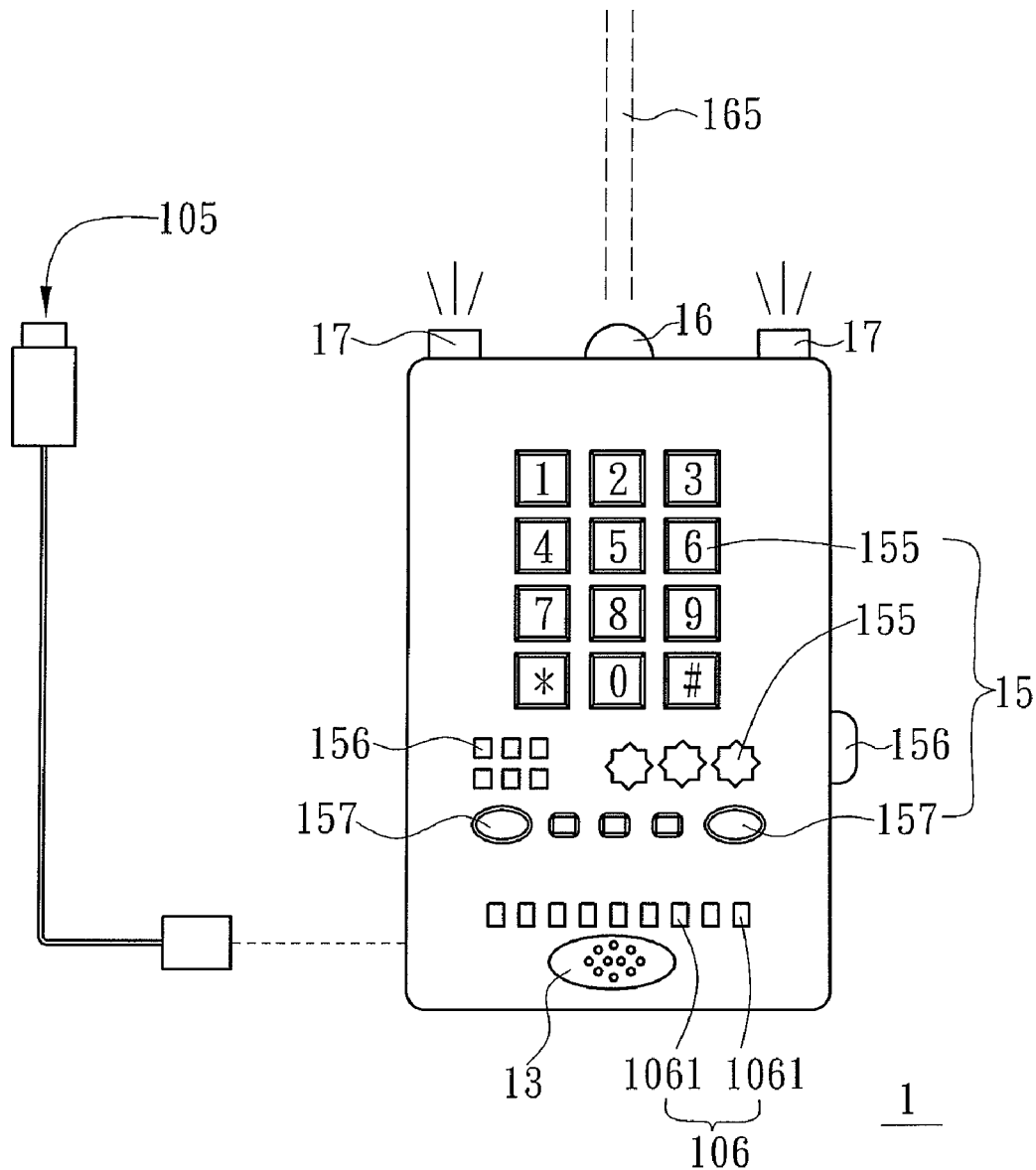
FIG. 1B is appearance diagram of the multi-function remote control according to the first embodiment of present invention.

Next, please refer to FIG. 1A and FIG. 1B correspondingly. FIG. 1B is appearance diagram of the multi-function remote control according to the first embodiment of present invention. As shown in FIG. 1B, the LED lamp 17 and the laser diode 16 is disposed at forefront of the multi-function remote control 1. When briefing before a projection screen, the functional button 155 of the button unit 15 could be pressed in order to control the monitor or projector device, and the LED button 157 could be pressed in order to light up the gloomy room by means of the LED lamp 17. When the pressed LED button 157 is released, the LED lamp 17 is turned out. If focusing on a specific region of the projection screen is needed, the laser button 156 could be pressed and then the laser diode 16 may emit red laser light 165 to conveniently point to the projection screen. Moreover, the detachable connector 105 could be plugged on the USB socket of a computer in order to charge power to the rechargeable battery 199; thus, don't ever worry about the power exhaustion if the time of the briefing is too long. The residual power display 106 is composed of pluralities of lamps 1061. When all of the lamps 1061 light up, that's indicated the rechargeable battery 199 is full power. When only one or two lamps 1061 light up, that's indicated the power of the rechargeable battery 199 is exhausting; then, the buzzer 13 might sound in order to remind people to charge power. Note that the disposition of the functional button 155 of button unit 15, LED button 157 and the laser button 156 are only illustrative, not to limit their appearance or placement.

The aforementioned multi-function remote control 1 could control many kinds of electrical equipments. When the controlled equipment is TV, guidance machine, monitor, digital frame or video equipment, the functional signal ($S_{func}$) could be option signal, confirm signal, TV channel signal or ON/OFF signal. When the controlled equipment is video player, stereo apparatus, multimedia player or projector equipment, the functional signal ($S_{func}$) could further include volume control signal. When the controlled equipment is air conditioner, the functional signal ($S_{func}$) could be temperature regulating signal.

Figure 2:
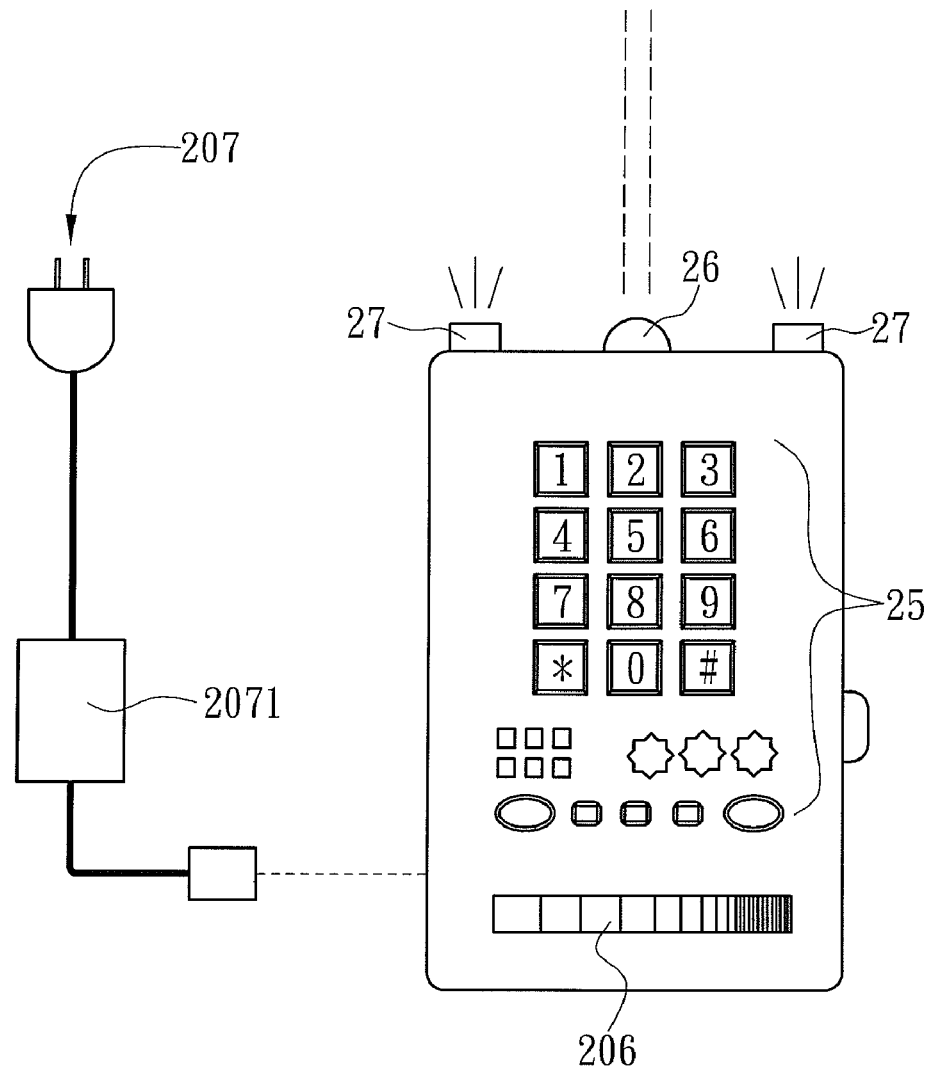
FIG. 2 is appearance diagram of the multi-function remote control according to the second embodiment of present invention.

Next, other embodiments are introduced. Please refer to FIG. 2, FIG. 2 is appearance diagram of the multi-function remote control according to the second embodiment of present invention. As shown in FIG. 2, the multi-function remote control 2 includes a residual power display 206, a button unit 25, a detachable connector 207, a laser diode 26 and two LED lamps 27. Wherein, the residual power display 206 might reveal the power of the rechargeable battery by means of continuous-type lamp. The detachable connector 207 is household-power plug with adaptor 2071. When charging power, what need to do is plug the detachable connector 207 into the electrical outlet on the wall.

Figure 3A:
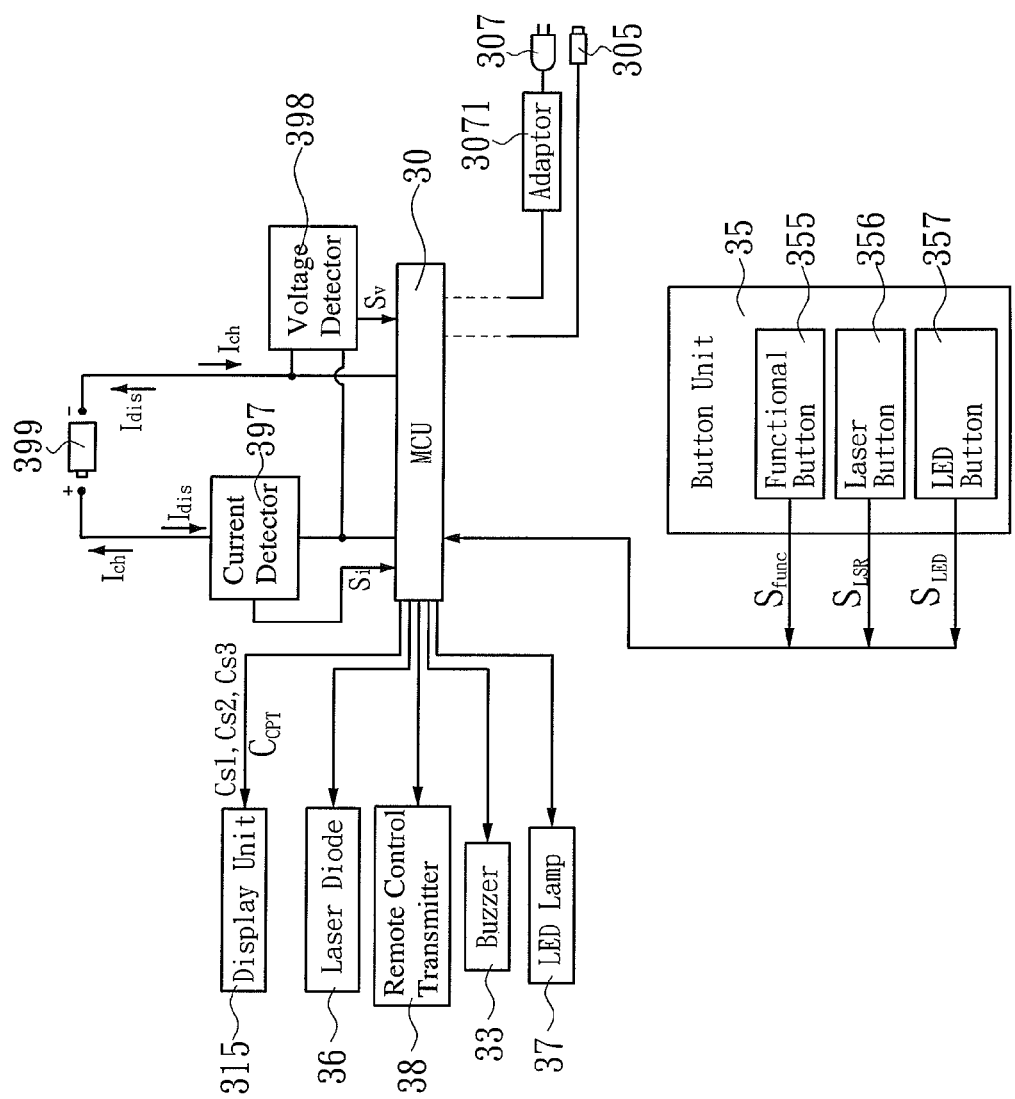
FIG. 3A is block diagram of the multi-function remote control according to the third embodiment of present invention.

Please refer to FIG. 3A, FIG. 3A is block diagram of the multi-function remote control according to the third embodiment of present invention. As shown in FIG. 3A, the multi-function remote control 3 is supplied power by a rechargeable battery 399. The multi-function remote control 3 comprises a MCU 30, a display unit 315, a button unit 35, a laser button 356, a functional button 355, a LED button 357, a remote control transmitter 38, a current detector 397, a voltage detector 398, two detachable connectors 305, 307, a laser diode 36, a buzzer 33 and a LED lamp 37. Wherein, the function and the configuration of the button unit 35, remote control transmitter 38, current detector 397, voltage detector 398, laser diode 36, buzzer 33 and the LED lamp 37 are similar to the embodiment of FIG. 1A, no need to further describe. In this embodiment, two detachable connectors 305, 307 are USB and household-power plug with adaptor 3071, respectively; thus, the multi-function remote control 3 might have alternative choice of power supply to charge power. The display unit 315 is a screen device which may reveal all kind of settings or functions of the multi-function remote control 3. When the functional button 355 of the button unit 35 is pressed, a functional signal ($S_{func}$) is outputted to the MCU 30 and then the display unit 315 reveals at least one functional content (Cs1, Cs2, Cs3 . . . ) correspondingly. Hence, user might check or regulate the setting of the multi-function remote control 3 by means of the presence of functional content (Cs1, Cs2, Cs3 . . . ). Except for the functional content (Cs1, Cs2, Cs3 . . . ), the display unit 315 might reveal the residual power value ($C_{CPT}$) of the rechargeable battery 399 after obtaining the residual power by means of analyzing the current-value signal ($S_i$) and voltage-value signal ($S_v$).

Figure 3B:
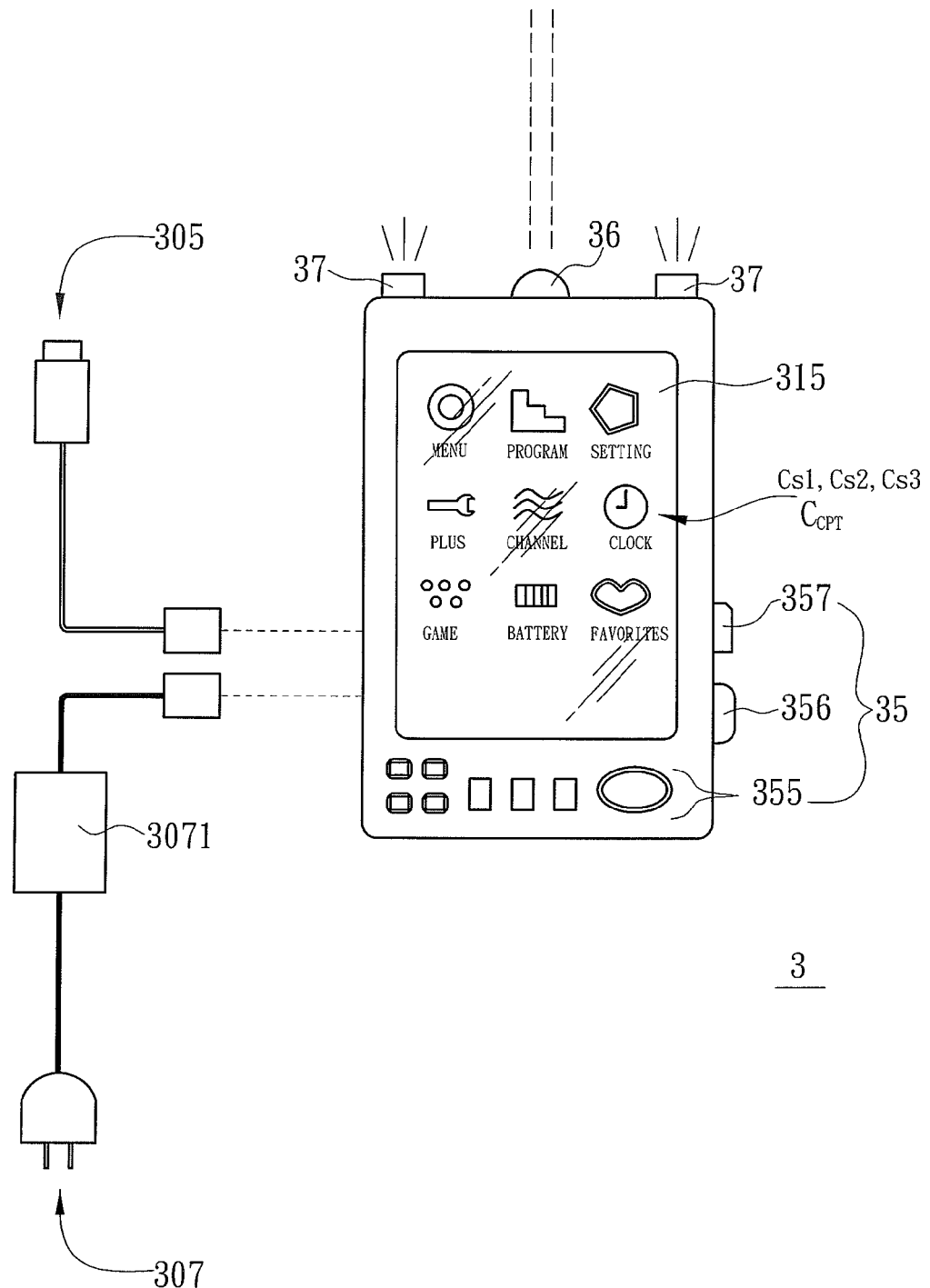
FIG. 3B is appearance diagram of the multi-function remote control according to the third embodiment of present invention.

Please refer to FIG. 3A and FIG. 3B, FIG. 3B is appearance diagram of the multi-function remote control according to the third embodiment of present invention. As shown in FIG. 3B, the display unit 315 is a screen device, which could reveal many functional contents (Cs1, Cs2, Cs3 . . . ) or residual power value ($C_{CPT}$) by means of the operation of the functional button 355 and the control of the functional signal ($S_{func}$).

Figure 4:
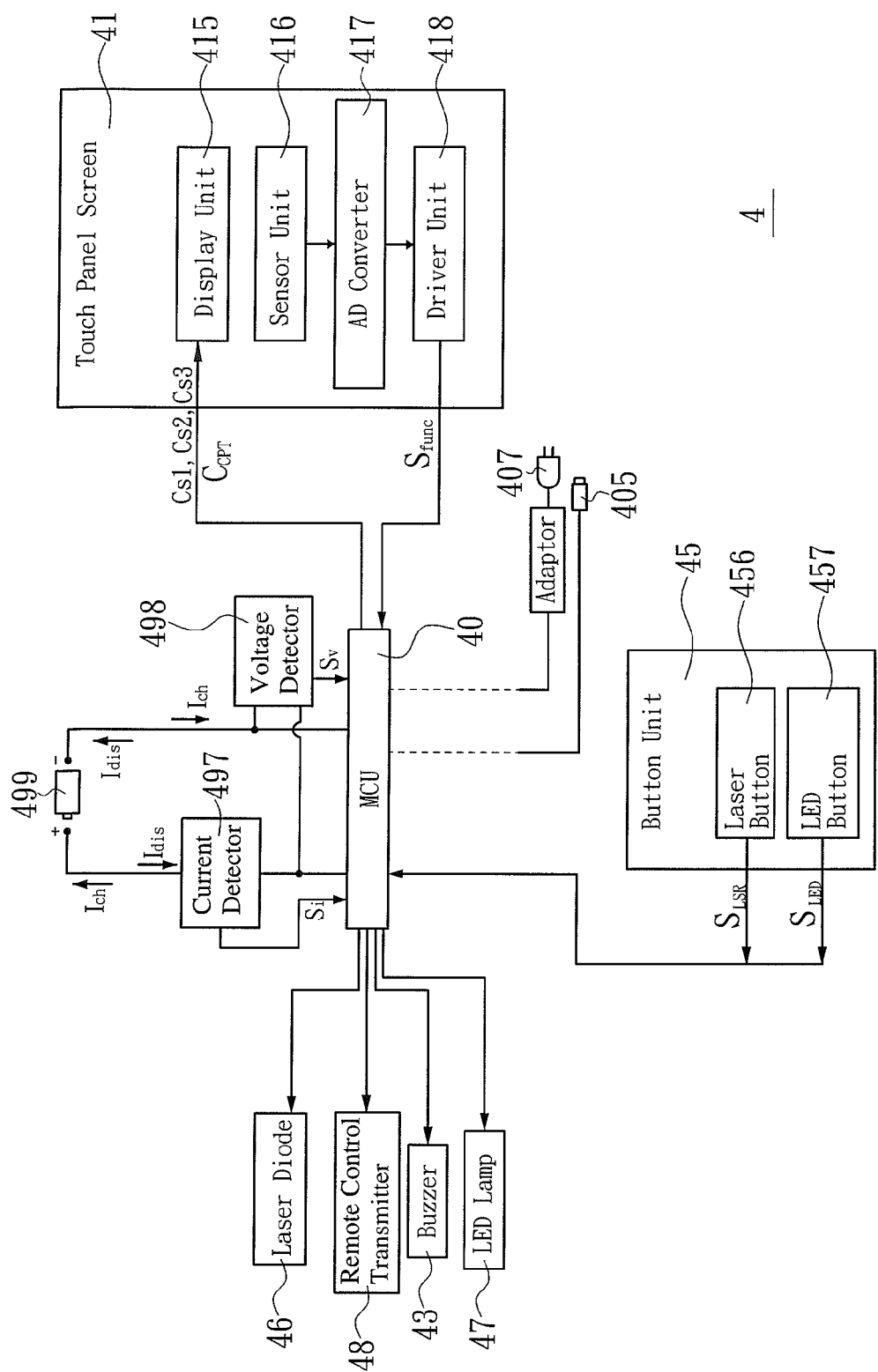
FIG. 4 is block diagram of the multi-function remote control according to the fourth embodiment of present invention.

Please refer to FIG. 4, FIG. 4 is block diagram of the multi-function remote control according to the fourth embodiment of present invention. As shown in FIG. 4, the multi-function remote control 4 is supplied power by a rechargeable battery 499. The multi-function remote control 4 comprises a MCU 40, a touch panel screen 41, a button unit 45, a laser button 456, a LED button 457, a remote control transmitter 48, a current detector 497, a voltage detector 498, two detachable connectors 405, 407, a laser diode 46, a buzzer 43 and a LED lamp 47. Wherein, the touch panel screen 41 is a Touch Panel, and includes a display unit 415, a sensor unit 416, an analog-to-digital converter 417 (AD converter) and a driver unit 418. The sensor unit 416 could sense the position and the movement of contact site; the AD converter 417 could transfer the analog signal of the position and movement into digital signal; the driver unit 418 could analyze the digital signal of the position and movement and hence confirm the chosen function, desired option or setting. Then, the driver unit 418 outputs a functional signal ($S_{func}$) to the MCU 40 and as a result the display unit 415 reveals at least one functional content (Cs1, Cs2, Cs3 . . . ) correspondingly. In this manner, the touch panel screen 41 not only could have display function, but also may operate or select the chosen function, desired option or setting by means of the sensor unit 416, AD converter 417 and driver unit 418. Additionally, as aforementioned described, the display unit 415 of touch panel screen 41 might also have similar function of showing the residual power value ($C_{CPT}$).

Summarily, the multi-function remote control of present invention has many functions including remote control, charging power, revealing residual power, and is able to conveniently control several household electrical equipments.

Figure 5:
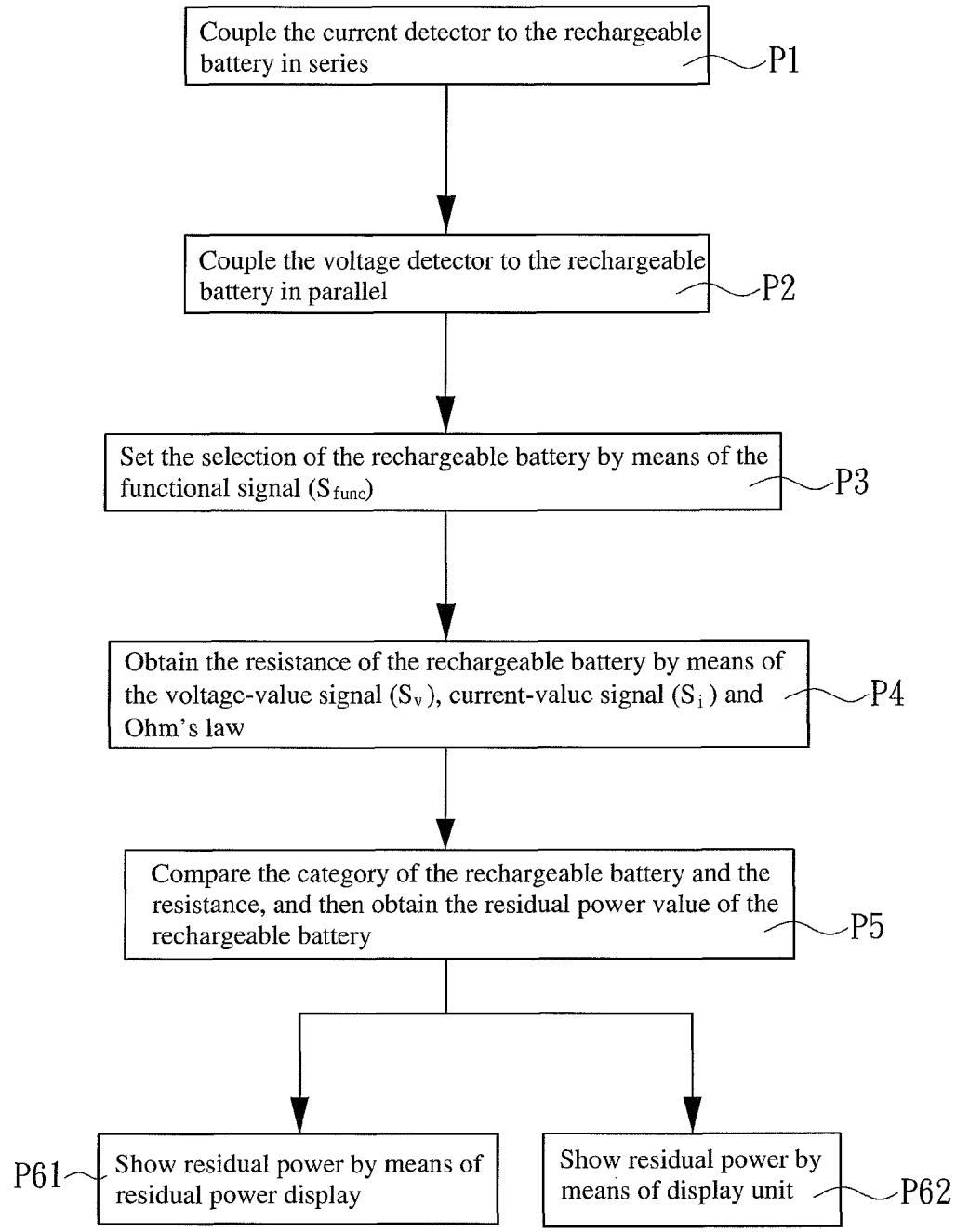
FIG. 5 is flow chart of obtaining residual power in present invention.

Next, the reason why the multi-function remote control is able to obtain the residual power is addressed. Below, the embodiment of FIG. 1A and FIG. 1B is illustratively introduced to show how it works. Simultaneously, please refer to FIG. 5, FIG. 5 is flow chart of obtaining residual power in present invention. Step P1: couple the current detector 197 to the rechargeable battery 199 in series, and hence the discharge current ($I_{dis}$) and the charge current ($I_{ch}$) both pass through the current detector 197. Step P2: couple the voltage detector 198 to the rechargeable battery 199 in parallel, and hence the voltage detector 198 crosses positive electrode and negative electrode of the rechargeable battery 199 so as to measure the voltage drop. Step P3: output the functional signal ($S_{func}$) so as to select and then set the category of the rechargeable battery 199 by means of pressing the functional button 155. Wherein, the functional signal ($S_{func}$) is rechargeable battery selecting signal. Besides, in other embodiments, the Step P1, P2, P3 are able to change their sequence. Next, step P4: obtain the resistance of the rechargeable battery 199 by means of the voltage-value signal ($S_v$), current-value signal ($S_i$) and Ohm's law. The reason is: voltage drop is equal to the product of current multiplying resistance. In this manner, after the MCU 10 receives the voltage-value signal ($S_v$) and current-value signal ($S_i$), then substituting the voltage value and current value into Ohm's law, as the result the resistance of the rechargeable battery 199 will be easily obtained. Step P5: compare the category of the rechargeable battery 199 and the resistance, and then obtain the residual power value of the rechargeable battery 199. The principle of aforementioned step P1~P5 is: the rechargeable battery 199 charges power or discharges power by means of chemical reversible reaction of materials inside the battery. The rechargeable battery 199 has different level of residual power that indicates the chemical compound and the condition of reversible reaction are both correspondingly varied, and hence the resistance of the rechargeable battery 199 is also shifted. In this manner, no matter charge and discharge, every material inside the rechargeable battery 199 has its own property that resistance of the rechargeable battery 199 corresponds to the residual power by a function value in mathematics. Namely, in charging, the residual power of the rechargeable battery 199 varies with its resistance; in discharging, the residual power of the rechargeable battery 199 also varies with its resistance. Therefore, what need to do next is make sure the category of the rechargeable battery 199, and experiment and then obtain "resistance/residual power comparison list" in charging mode and discharge mode. As a result, after coding the comparison list into the MCU 10, it is able to obtain residual power value ($C_{CPT}$) of the rechargeable battery 199 by means of step P5, and then output the residual power value ($C_{CPT}$) in real-time. As far as multi-function remote controls 1, 2 in FIG. 1A and FIG. 2 are concerned, the residual power will be instantly revealed by means of the residual power display 106, 206, as shown in step P61. Alternatively, as far as multi-function remote controls 3, 4 in FIG. 3A and FIG. 4 are concerned, the residual power will be instantly revealed by means of the display unit 315, 415, as shown in step P62.

Summarily, the multi-function remote control of present invention might control many kinds of electrical equipments, as well as serve as flashlight and laser pointer. Besides, it could charge power to all categories of rechargeable batteries, thus no need to further purchase power charger and replace battery of the remote control. Furthermore, the method for obtaining residual power could instantly reveal the residual power of any rechargeable battery by means of the multi-function remote control. This would definitely increase the convenience and diversification of present invention.

While certain exemplary embodiments have been described and shown in the accompanying drawings, it is to be understood that such embodiments are merely illustrative of and not restrictive on the broad invention, and that this invention is not be limited to the specific constructions and arrangements shown and described, since various other modifications may occur to those ordinarily skilled in the art.

I claim:

1. A multi-function remote control which is supplied power by a rechargeable battery, the multi-function remote control comprising:
a micro controller unit (MCU) coupling to the rechargeable battery and then charging or discharging the rechargeable battery;
a residual power display;
a button unit including pluralities of functional buttons, the functional button outputting a functional signal ($S_{func}$) to the MCU when the functional button is pressed;
a remote control transmitter transmitting encoded infrared signal by means of the control of the MCU when the MCU receives the functional signal ($S_{func}$);
a current detector measuring the current of the rechargeable battery and correspondingly outputting a current-value signal ($S_i$) to the MCU;
a voltage detector measuring the voltage of the rechargeable battery and correspondingly outputting a voltage-value signal ($S_v$) to the MCU, the MCU obtaining the residual power of the rechargeable battery by means of analyzing the current-value signal ($S_i$) and voltage-value signal ($S_v$), and then revealing the corresponding residual power by the residual power display;
at least one detachable connector coupling to the MCU, the MCU charging the rechargeable battery when the detachable connector is connected to external power supply;
whereby, the multi-function remote control might have functions of remote control, charging and revealing residual power.

2. The multi-function remote control as claim 1, wherein the functional signal ($S_{func}$) could be option signal, confirm signal, TV channel signal, volume control signal, temperature regulating signal, ON/OFF signal or rechargeable battery selecting signal.

3. The multi-function remote control as claim 1, wherein the multi-function remote control further includes a laser diode and the button unit further includes a laser button, the laser button might output a laser signal ($S_{LSR}$) to the MCU and then the laser diode might emit laser light by means of the control of the MCU when the laser button is pressed.

4. The multi-function remote control as claim 1, wherein the multi-function remote control further comprises a Light-Emitting Diode (LED) lamp and the button unit further comprises a LED button such that a LED signal ($S_{LED}$) is outputted to MCU and then the LED lamp emits light by means of the control of the MCU when the LED button is pressed.

5. The multi-function remote control as claim 1, wherein the multi-function remote control further comprises a buzzer and the buzzer could sound by means of the control of the MCU.

6. The multi-function remote control as claim 1, wherein the current detector is coupled to rechargeable battery in series and the voltage detector is coupled to rechargeable battery in parallel.

7. The multi-function remote control as claim 1, wherein the detachable connector could be Universal Serial Bus (USB), Mini USB or household-power plug with adaptor.

8. A multi-function remote control which is supplied power by a rechargeable battery, the multi-function remote control comprising:
a micro controller unit (MCU) coupling to the rechargeable battery and then charging or discharging the rechargeable battery;
a display unit;
a button unit including pluralities of functional buttons, the functional button outputting a functional signal ($S_{func}$) to the MCU and then the display unit revealing at least one functional content (Cs1, Cs2, Cs3 . . . ) correspondingly when the functional button is pressed;
a remote control transmitter transmitting encoded infrared signal by means of the control of the MCU when the MCU receives the functional signal ($S_{func}$);

a current detector measuring the current of the rechargeable battery and correspondingly outputting a current-value signal ($S_i$) to the MCU;

a voltage detector measuring the voltage of the rechargeable battery and correspondingly outputting a voltage-value signal ($S_v$) to the MCU, the MCU obtaining the residual power of the rechargeable battery by means of analyzing the current-value signal ($S_i$) and voltage-value signal ($S_v$), and then revealing the corresponding residual power by showing the residual power value ($C_{CPT}$) on the display unit;

at least one detachable connector coupling to the MCU, the MCU charging the rechargeable battery when the detachable connector is connected to external power supply;

whereby, the multi-function remote control might have functions of remote control, charging and revealing residual power.

9. The multi-function remote control as claim 8, wherein the functional signal ($S_{func}$) could be option signal, confirm signal, TV channel signal, volume control signal, temperature regulating signal, ON/OFF signal or rechargeable battery selecting signal.

10. The multi-function remote control as claim 8, wherein the multi-function remote control further includes a laser diode and the button unit further includes a laser button, the laser button might output a laser signal ($S_{LSR}$) to the MCU and then the laser diode might emit laser light by means of the control of the MCU when the laser button is pressed.

11. The multi-function remote control as claim 8, wherein the multi-function remote control further comprises a Light-Emitting Diode (LED) lamp and the button unit further comprises a LED button such that a LED signal ($S_{LED}$) is outputted to MCU and then the LED lamp emits light by means of the control of the MCU when the LED button is pressed.

12. The multi-function remote control as claim 8, wherein the multi-function remote control further comprises a buzzer and the buzzer could sound by means of the control of the MCU.

13. The multi-function remote control as claim 8, wherein the current detector is coupled to rechargeable battery in series and the voltage detector is coupled to rechargeable battery in parallel.

14. The multi-function remote control as claim 8, wherein the detachable connector could be Universal Serial Bus (USB), Mini USB or household-power plug with adaptor.

15. A method for obtaining residual power from the multi-function remote control as claim 1, the step comprises:

coupling the current detector to the rechargeable battery in series;

coupling the voltage detector to the rechargeable battery in parallel;

setting the selection of the rechargeable battery by means of the functional signal ($S_{func}$);

obtaining the resistance of the rechargeable battery by means of the voltage-value signal ($S_v$), current-value signal ($S_i$) and Ohm's law;

comparing the category of the rechargeable battery and the resistance, and then obtaining the residual power value of the rechargeable battery.

16. The method for obtaining residual power as claim 15, wherein the MCU outputs the residual power value instantly.

* * * * *